United States Patent Office 2,910,385
Patented Oct. 27, 1959

2,910,385

PRODUCTION OF MOISTUREPROOF SHEET WRAPPING MATERIALS COATED WITH COPOLYMERS APPLIED FROM AQUEOUS DISPERSIONS

William Berry, Richard Arthur Rose, Cyril Howard Phillips, and Charles Robert Oswin, Bridgwater, England, assignors to British Cellophane Limited, Bridgwater, England, a British company No Drawing. Application October 31, 1955
Serial No. 544,018

Claims priority, application Great Britain
November 25, 1954

6 Claims. (Cl. 117—138.8)

This invention is for improvements in or relating to the production of moistureproof sheet wrapping materials coated with copolymers applied from aqueous dispersions.

A process for the production of moistureproof sheet wrapping material is described in British patent specification No. 655,732, which process comprises the step of applying an aqueous dispersion of vinylidene chloride/acrylonitrile copolymer, prepared as therein described, to non-fibrous hydrophilic film, for example regenerated cellulose film, as base, in a layer of such thinness that the water thereof is wholly absorbed by the base film and the dispersed copolymer thereof coalesces to form a smooth, transparent, moistureproof surface coating. It is stated that the copolymer of the dispersion should be predominantly amorphous in order to ensure the ready coalescence of the copolymer on the base film essential to the formation of a continuous, unbroken protective coating on the base film. Water may be removed from the coated film by evaporation by heat.

It has been observed, however, when operating the above process, that the drying operation by which water is removed from the coated film by evaporation by heat, is not entirely satisfactory. Thus in cases where water is removed from the film by evaporation through the moistureproofing surface coating by heat at a relatively low temperature of about 50° C., the drying operation is normally found to me uneconomically slow. On the other hand, in cases where water is removed from the film by evaporation by heat at a relatively high temperature of, for example, 120° C., blisters of water-vapour are liable to form beneath the moistureproofing surface coating, with the result that the appearance, and also the moistureproof properties, of the sheet material are so gravely impaired as to render the sheet material unsuitable for use in the wrapping art.

One of the objects of the present invention is to provide a process for the production of moistureproof sheet wrapping material, by forming a continuous, unbroken, smooth transparent surface coating of a crystalline, synthetic organic polymer on a base of water-sensitive, organic, non-fibrous film, whereby the difficulties hereinabove referred to are minimised or eliminated.

Accordingly, the present invention provides a process for the production of moistureproof sheet wrapping material, comprising a flexible base film of water-sensitive, organic non-fibrous material and a moistureproofing surface coating comprising essentially a normally crystalline, synthetic organic polymer, which process comprises forming upon the base film a smooth, transparent, non-moistureproofing surface coating comprising imperfectly coalesced particles of the polymer, said particles being capable of further coalescence by heat-treatment and applied to the base film as an aqueous colloidal dispersion containing the polymer, in partially crystalline state as indicated by at least one distinct ring, and at the most three distinct rings, observable in the X-ray diffraction pattern of the dispersion, drying the non-moistureproof coated film by evaporation by heat at a temperature too low to promote rapid further coalescence of the colloidal polymer particles of the surface coating, and thereafter subjecting the dried film to heat-treatment at a temperature sufficiently high to promote rapid coalescence of the colloidal polymer particles of the surface coating, for a time sufficiently long to complete the coalescence thereof, whereby a smooth transparent moistureproofing surface coating of crystalline synthetic organic polymer is formed on the base film, and finally cooling the film.

By the term "moistureproof" is meant a degree of impermeability of the coated film to water-vapour of less than 400 grams per 100 square metres per hour over a 24 hours period at 39.5°±0.5° C. at a humidity differential of at least 95% when the base film is surface coated on both sides with a total weight of 3 grams of non-volatile coating per square metre.

In carrying out the process of the invention, the smooth, transparent, non-moistureproofing surface coating, comprising imperfectly coalesced particles of the polymer, is formed upon the base film by applying to the base film an aqueous colloidal dispersion containing the polymer in partially crystalline state, as indicated by at least one distinct ring, and at the most three distinct rings, observable in the X-ray diffraction pattern of the dispersion. The aqueous colloidal dispersion of the polymer in partially crystalline state should be applied to the base film in a layer of such thinness that the water thereof is wholly absorbed by the base film.

Whether or not the polymer particles of the aqueous dispersion are in the crystalline state may be determined in the usual fashion from an X-ray diffraction pattern of the dispersed polymer. How this is done is well known to those skilled in the art. The presence of definite rings in the diffraction pattern of the dispersed polymer identifies the crystalline character of the polymer.

The polymer may be prepared in the dispersed partially crystalline state most conveniently by reacting the emulsified monomer or mixture of copolymer-forming monomers in the aqueous medium containing the dispersing agent, together with the initiator and activator, in the known way, and ageing the aqueous polymer or copolymer dispersion formed. The polymerisation reaction is preferably carried out under reflux and with stirring. Shortly after its preparation, the polymer dispersed in the dispersion is predominantly amorphous, and remains in that form for a period which varies from a few hours to as much as 10 or 15 days, or even longer, depending on the nature of the polymer. However, after the dispersion has aged sufficiently, diffraction "rings," characteristic of crystalline material, become clearly discernible in the X-ray pattern of the dispersed polymer. Ageing may be accelerated by raising the temperature, and is also governed to some extent by the nature and concentration of the dispersing agent, and of the initiator and activator, employed in the preparation of the dispersion.

Synthetic organic polymers and copolymers which are not normally crystalline, or which are incapable, when applied as a surface coating to both sides of a flexible film of water-sensitive, organic, non-fibrous material, as base, in thickness corresponding to a total weight of 3 grams of non-volatile coating per square metre, of yielding a moistureproof film, are unsuitable for employment in the process of the present invention.

The extent of the ageing to which the polymer dispersion should be subjected is rather critical. When an under-aged polymer dispersion is applied as a thin surface coating to a regenerated cellulose base film, the dispersed polymer coalesces readily at room temperature to yield a moistureproof film. When an over-aged polymer dispersion is similarly applied, coalescence of the polymer particles cannot be completed even by prolonged exposure to heat-treatment at a temperature sufficiently high to promote rapid coalescence of the colloidal polymer particles of the surface coating when a correctly aged aqueous copolymer dispersion is employed. Furthermore, the use of an over-aged dispersion in which the polymer particles cannot be completely coalesced by prolonged exposure to heat results in a hazy or cloudy appearance of the coated film instead of a glass-clear transparent appearance thereof. For employment in the process of the present invention, the aqueous colloidal dispersion containing the polymer in partially crystalline state should, when applied to both sides of a normally softened film of regenerated cellulose in a layer of such thinness as to provide a surface coating on both sides with a total weight of 3 grams of non-volatile coating per square metre, yield a coated film, dried by evaporation by heat at a temperature too low to promote rapid coalescence of the colloidal polymer particles of the surface coating, showing a permeability value of at least 500, and at least 3 times, and preferably 10 to 20 times, the permeability value of coated film prepared in the same way except that the aqueous colloidal dispersion contains the polymer in the predominantly amorphous form. The best results are obtained when the permeability value of the film, non-moistureproof coated by application of the dispersion of the polymer in the partially crystalline state and dried by evaporation by heat at a temperature too low to promote rapid coalescence of the colloidal polymer particles of the surface coating, is over 1000.

The temperature which is sufficiently high to promote rapid coalescence of the colloidal polymer particles of the surface coating will vary with the nature of the polymer and with the degree of crystallinity of the particles, but will usually lie between 80° C. and the softening temperature range of the polymer in that degree of crystallinity (the temperature range within which the polymer softens varies, for any given polymer, with the degree of crystallinity of that particular polymer). In some cases, however, higher temperatures of, for example, up to 180° C. or even higher, but lower than the temperature at which the polymer decomposes, may be employed with advantage.

The dried film should be subjected to heat-treatment, at a temperature sufficiently high to promote rapid coalescence of the colloidal polymer particles of the surface coating, for a time sufficiently long to complete the coalescence of the polymer particles. This time will normally lie within the range between ½ second and 10 seconds. Rather too prolonged heat-treatment does not impair the moistureproofness of the finished film.

The heat-treated film may be cooled simply by passing it into air at room-temperature.

All types of synthetic organic polymers which are normally crystalline, and which are capable when applied as a surface coating to both sides of a flexible film of water-sensitive, organic, non-fibrous material, as base, in thickness corresponding to a total weight of 3 grams of non-volatile coating per square metre, of yielding moistureproof film, are suitable for employment in the process of the present invention. Vinylidene chloride polymers are preferred. As examples of vinylidene chloride polymers suitable for employment in the process of the present invention, there may be mentioned polyvinylidene chloride, copolymers of vinylidene chloride/acrylonitrile, vinylidene chloride/methacrylonitrile, vinylidene chloride/methyl acrylate, vinylidene chloride/ethyl acrylate, vinylidene chloride/butyl acrylate, vinylidene chloride/isobutyl acrylate, vinylidene chloride/methyl methacrylate, vinylidene chloride/ethyl methacrylate, vinylidene chloride/butyl methacrylate, vinylidene chloride/isobutyl methacrylate, vinylidene chloride/vinyl chloride, and vinylidene chloride/vinyl acetate. Itaconic acid or itaconic anhydride, or citraconic acid or citraconic anhydride, or mesaconic acid, may be copolymerised with any of the above copolymers to give three-component systems. The minimum vinylidene chloride content for the polymer system will vary with each particular mixture of monomers employed, but can be readily determined by methods well known in the art. Generally speaking, the proportion of monomeric vinylidene chloride comprised in the mixture of monomers from which the copolymer is obtained by polymerisation should not be less than 80%.

The flexible base film of water-sensitive, organic non-fibrous material, which is coated with the moistureproofing surface coating may be flexible film of any hydrophilic film-forming material. Because of its commercial availability and importance, softened regenerated cellulose film constitutes the preferred base film. Other suitable films for use, as base, are films of polyvinyl alcohol, lowly etherified cellulose, lowly esterified cellulose, gelatine, casein, and alginic acid derivatives.

The preferred total thickness of the finished dry surface coating on both sides of the film lies within the range corresponding to 3 to 8 grams of the said dry coating per square metre.

The following results, set out below by way of illustration, are typical:

A 40% aqueous dispersion of a copolymer, prepared by emulsion polymerisation of a mixture comprising 94 parts (by weight) of monomeric vinylidene chloride, 6 parts (by weight) of monomeric methyl methacrylate, and 0.5 part (by weight) of itaconic acid, was applied at a temperature of 20° C., while the copolymer contained in the dispersion was predominantly amorphous, as a thin surface coating to regenerated cellulose base film. The dispersed copolymer coalesced satisfactorily to yield a surface coated film, which was then dried at 25° C. The total thickness of the finished dry surface coating on both sides of the film corresponded to 3 grams of the dry coating per square metre, and the permeability value of the coated film was 91. Subsequent heat-treatment of the coated film for 2½ seconds at progressively higher temperatures up to 140° C. had but slight effect on the permeability value. The aqueous dispersion was then aged for 4 days (reckoned from the time of its completed preparation) at 25° C., with the result that the copolymer contained in the dispersion became partially crystalline, and the experiment was repeated. The results are shown in Table I below:

TABLE I

*Permeability values of heat-treated dried copolymer coated films*

| Condition of the copolymer of the dispersion | Temperature of the heat-treatment of the dried film | | | |
|---|---|---|---|---|
| | 25° C. | 60° C. | 110° C. | 140° C. |
| Substantially amorphous | 91 | 81 | 74 | 68 |
| Partially crystalline (after 4 days' ageing) | >2,000 | 920 | 182 | 58 |

The softening range of the copolymer in the final crystalline state was 155° to 165° C. After the dispersion had aged for 7 days at 25° C., coalescence of the polymer particles of the coating could not be completed even by prolonged exposure to heat-treatment.

In a further series of tests, an aqueous vinylidene chloride/methyl methacrylate/itaconic acid copolymer was prepared by stirring together at 40° C., under reflux, the following materials until polymerisation of the mixture of copolymerisable ingredients was complete:

| | Parts |
|---|---|
| Vinylidene chloride (monomer) | 94 |
| Methyl methacrylate (monomer) | 6 |
| Itaconic acid (monomer) | 1 |

| | Parts |
|---|---|
| Water (distilled) | 150 |
| Dispersol L (30% solution of a condensation product of formaldehyde and sodium naphthalene sulphonate)[1] | 3.3 |
| Sodium dodecyl benzene sulphonate | 0.25 |
| Ammonium persulphonate | 0.6 |
| Sodium metabisulphite | 0.3 |

[1] "Dispersol" is a registered trademark.

The aqueous copolymer dispersion so formed was applied, at different time-intervals after its manufacture, to both sides of softened film of regenerated cellulose (thickness 0.0009"), by the method described in British patent specification No. 663,645, in a layer on each side of such thinness that the water of the dispersion was wholly absorbed by the base film and the dispersed copolymer of the applied dispersion formed an apparently continuous and unbroken, smooth, transparent, protective coating on both sides of the base film.

These coated films were dried by removal of water therefrom by evaporation by heat at a temperature of 40° C., until the water-content of the films had been reduced to 8% by weight, based on the weight of the oven-dry film, and the dried films were subsequently subjected to heat-treatment at a temperature of 160° C. for 2½ seconds. The total coating thickness on both sides of the film was equivalent to 4 grams per square metre. The permeability value, appearance and ease of heat-treatment were recorded in each case.

At similar time-intervals, X-ray diffraction patterns of the aqueous copolymer dispersions were obtained as an indication of the condition of the copolymer particles.

The results are summerized in Table II below.

The aqueous copolymer dispersion, immediately after its preparation, was cooled to 20° C. and was aged for 4 days at that temperature. The aged aqueous dispersion of the copolymer contained the copolymer in partially crystalline state.

The aged aqueous copolymer dispersion, containing the copolymer in partially crystalline state, was applied to both sides of a softened film of regenerated cellulose (thickness 0.0009"), by the method described in the British patent specification No. 663,645, in a layer on each side of such thinness that the water of the dispersion was wholly absorbed by the base film and the dispersed copolymer of the applied dispersion formed an apparently continuous and unbroken, smooth, transparent, protective surface coating on both sides of the base film. The coated film had a permeability value of more than 2000, and was thus non-moistureproof.

This non-moistureproof coated film was dried by removal of water therefrom by evaporation by heat at a temperature of 90° C. for 15 seconds, until the water-content of the film had been reduced from 20% to 8% by weight, based on the weight of the oven-dry film. The permeability value of the dried film was 800. The dried film was subjected to heat-treatment at 160° C. for 3 seconds, whereby the coalescence of the copolymer particles of the coating was completed, and a continuous, unbroken, smooth, transparent surface coating of crystalline synthetic organic polymer was formed on the base film. The total coating thickness on both sides of the film was equivalent to 3 grams per square metre. The finished film, after cooling in air, was wound as a reel.

The finished film had a permeability value of 58, and

TABLE II

| Age of dispersion | X-ray diffraction pattern | Condition of particles | Permeability value of coated film dried at 40° C. | Permeability value of coated film heat-treated at 160° C. | Appearance of film | Ease of heat-treatment at 160° C. |
|---|---|---|---|---|---|---|
| 1 day | No rings | Substantially amorphous | 34 | 21 | Clear | Blisters. |
| 2 days | do | do | 46 | 21 | do | Do. |
| 2½ days | First sign of a ring | do | | | do | Do. |
| 3 days | 1 ring sharpening | Partially crystalline | 650 | 31 | do | No difficulty. |
| 4 days | Further ring appearing | do | More than 2,000 | 46 | do | Do. |
| 7 days | 3 rings | do | do | 38 | do | Do. |
| 10 days | 4 rings | Becoming more crystalline | do | 125 | Slightly hazy | Do. |
| 3 months | do | Substantially crystalline | do | More than 2,000 | Cloudy | Do. |

Specific methods of carrying the invention into effect will now be described by way of illustration with reference to the following examples.

Throughout the present specification, parts and proportions are parts and proportions by weight unless otherwise stated.

EXAMPLE I

Moistureproof sheet wrapping material was produced in the following way.

An aqueous vinylidene chloride/acrylonitrile/itaconic acid copolymer dispersion was prepared by stirring together at 40° C., under reflux, the following materials until polymerisation of the mixture of copolymerisable ingredients was complete:

| | Parts |
|---|---|
| Vinylidene chloride (monomer) | 95 |
| Acrylonitrile (monomer) | 5 |
| Itaconic acid (monomer) | 0.5 |
| Water (distilled) | 150 |
| Dispersol L (30% solution of the condensation product of formaldehyde and sodium naphthalene sulphonate)[1] | 3.3 |
| Ammonium persulphate | 0.6 |
| Sodium metabisulphite | 0.3 |

[1] "Dispersol" is a registered trademark.

was well suited for use as moistureproof sheet wrapping material.

By way of comparison, it may be mentioned that attempts to coat softened regenerated cellulose film with the aqueous copolymer dispersion under the same conditions as those described above, but within 24 hours of its preparation, when the copolymer of the dispersion was found to be predominantly amorphous, led to the production of a film containing over 12% of water (by weight, based on the weight of the oven-dry film), and the coating was marred by blisters formed by water-vapour in attempts to escape through the impervious coating.

EXAMPLE II

Moistureproof sheet wrapping materials were produced in the way described in Example I, except that the vinylidene chloride/acrylonitrile/itaconic acid copolymer was replaced by vinylidene chloride/acrylonitrile copolymers prepared by polymerisation of mixtures comprising monomeric vinylidene chloride and monomeric acrylonitrile employed in proportions (by weight) set out in Table III below. Table III shows also the ageing times, at 20° C., for optimum results, and the permeability values of the finished films.

TABLE III

| Monomer ratio | | Ageing time for optimum results (20° C.) | Permeability value |
|---|---|---|---|
| Vinylidene chloride | Acrylonitrile | | |
| 92 | 8 | 10 days | 95 |
| 93 | 7 | 4 days | 88 |
| 94 | 6 | 48 hours | 51 |
| 95 | 5 | 36 hours | 30 |
| 96 | 4 | 24 hours | 20 |

The aged aqueous copolymer dispersion contained the copolymer in partially crystalline state.

EXAMPLE III

Moistureproof sheet wrapping materials were produced in the way described in Example II except that, as regards the 94/6 and 96/4 vinylidene chloride/acrylonitrile copolymers, the proportion of the dispersing agent (Dispersol L) employed in the preparation of the aqueous copolymer dispersion, was doubled. The results are shown in Table IV below.

TABLE IV

| Monomer ratio | | Ageing time for optimum results (20° C.), days | Permeability value |
|---|---|---|---|
| Vinylidene chloride | Acrylonitrile | | |
| 94 | 6 | 10 | 41 |
| 96 | 4 | 7 | 23 |

The aged aqueous copolymer dispersion contained the copolymer in partially crystalline state.

It will be understood that known slip agents and/or other known additives may be incorporated in the aqueous copolymer dispersion, if desired.

The production of moistureproof sheet wrapping material by the process of the invention has the advantage, compared with previously known processes, that it is no longer necessary to apply the aqueous copolymer dispersion to the base film within a short time, amounting in some cases to but a few hours, of the completed preparation of the dispersion, during which the polymer particles of the dispersion remain in the predominantly amorphous state. In the production of moistureproof sheet wrapping material by the process of the invention, the aqueous copolymer dispersion may be kept, ready for use with the polymer particles in the partially crystalline state, for comparatively longer periods, with the advantage that interruption in the production of the moistureproof sheet wrapping material no longer involves serious loss of the aqueous copolymer dispersion through the latter becoming unsuitable for use in the process of manufacture.

The permeability value was determined by the method of Church and Scroggie for measuring permeability, as described in Paper Trade Journal (TAPPI Section), October 3, 1935, pages 201 to 209.

Water-sensitive materials are characterised in that they absorb water when they are brought into contact with water or water-vapour.

We claim:
1. A process for the production of moisture-proof sheet wrapping material consisting of a flexible base film of a water-sensitive, organic, non-fibrous material having a smooth adherent coating of a normally crystalline, synthetic organic polymer selected from the group consisting of vinylidene chloride polymers and copolymers which process comprises preparing an aqueous colloidal dispersion of the polymer wherein the polymer is in a predominately amorphous state, aging said dispersion to convert the polymer from said predominantly amorphous sate to a partially crystalline state in which the particles of polymer exhibit an X-ray diffraction pattern having at least one but not more than three distinct rings; applying the aged colloidal dispersion to at least one side of the base film in a layer of such thinness that the water component is adsorbed by the base film when the polymer particles form a smooth, transparent, imperfectly coalesced non-moistureproofing surface coating on the base film; removing the adsorbed water from the base film by evaporation at a temperature such that the permeability value of the coated film is at least 500; and thereafter subjecting the coated film to a temperature sufficiently elevated to complete the coalescence of the polymer particles and reduce the permeability value of the coated film below 400 to render the film moisture proof.

2. A process as claimed in claim 1 in which the base film is coated with a surface coating on both sides having a total weight of 3 grams of non-volatile coating per sq.m.

3. A process as claimed in claim 1, in which the copolymer is selected from the group consisting of vinylidene chloride/acrylonitrile, vinylidene chloride/methacrylonitrile, vinylidene chloride/methyl acrylate, vinylidene chloride/ethyl acrylate, vinylidene chloride/butyl acrylate, vinylidene chloride/isobutyl acrylate, vinylidene chloride/methyl methacrylate, vinylidene chloride/ethyl methacrylate, vinylidene chloride/butyl methacrylate, vinylidene chloride/isobutyl methacrylate, vinylidene chloride/vinylchloride, and vinylidene chloride/vinyl acetate.

4. A process as claimed in claim 3, in which the copolymer is such that there has been copolymerised therewith to give a three-component system a substance selected from the group consisting of itaconic acid, itaconic anhydride, citraconic acid, citraconic anhydride and mesaconic acid.

5. A process as claimed in claim 1, in which the film of water-sensitive, organic non-fibrous material is film of regenerated cellulose.

6. A process as claimed in claim 1, in which the film of water-sensitive, organic non-fibrous material is film selected from the group consisting of polyvinyl alcohol, lowly etherified cellulose, lowly esterified cellulose, gelatine, casein and alginic acid derivative.

References Cited in the file of this patent

UNITED STATES PATENTS

| 2,570,478 | Pitzl | Oct. 9, 1951 |
| 2,618,575 | Oswin | Nov. 18, 1952 |
| 2,721,150 | Gratham | Oct. 18, 1955 |
| 2,721,151 | Gratham | Oct. 18, 1955 |

FOREIGN PATENTS

| 655,732 | Great Britain | Aug. 1, 1951 |